(12) United States Patent
Pezet et al.

(10) Patent No.: US 6,314,767 B2
(45) Date of Patent: *Nov. 13, 2001

(54) APPARATUS FOR MANUFACTURING AN OPTICAL FIBER PREFORM AND INCLUDING A RING FOR TRAPPING AND DIFFUSING LIGHT RADIATION

(75) Inventors: Didier Pezet, Saint Sébastien de Morcent; Gérard Lavanant, Lambersart, both of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,394

(22) Filed: Apr. 5, 1999

(30) Foreign Application Priority Data

Apr. 6, 1998 (FR) .................................................. 98 04229

(51) Int. Cl.[7] ................................................ C03B 37/029
(52) U.S. Cl. ................................ 65/510; 65/537; 65/292; 65/271
(58) Field of Search ............................ 65/412, 417, 510, 65/511, 57, 537, 292, 271

(56) References Cited

U.S. PATENT DOCUMENTS

| | | | |
|---|---|---|---|
| 1,701,541 | * 2/1929 | Ray | 65/57 |
| 3,427,143 | * 2/1969 | Deery | 65/279 |
| 4,286,978 | 9/1981 | Bailey et al. | |
| 4,295,870 | * 10/1981 | Schneider | 65/417 |
| 4,317,667 | 3/1982 | Spainhour | |
| 4,347,069 | * 8/1982 | Haney | 65/417 |
| 4,389,231 | 6/1983 | Partus | |
| 4,971,614 | 11/1990 | D'Annessa et al. | |
| 5,127,929 | * 7/1992 | Gunther | 65/412 |
| 5,244,485 | * 9/1993 | Hihara | 65/412 |
| 5,658,363 | * 8/1997 | Ince | 65/412 |
| 5,702,497 | * 12/1997 | Oh | 65/412 |

FOREIGN PATENT DOCUMENTS 35 07 727 A1    9/1986 (DE).

* cited by examiner

Primary Examiner—John Hoffman
(74) Attorney, Agent, or Firm—Sughrue, Mion, Zinn, Macpeak & Seas, PLLC

(57) ABSTRACT

An apparatus and method for manufacturing an optical fiber preform from a tube of vitreous material. A holding device holds the tube during manufacture of the preform and a heater supplies the necessary heat energy for preform manufacturing. A diffuser is disposed adjacently to an end of the tube of vitreous material to trap and diffuse light radiation generated in the tube by the heater. The invention can be used in an apparatus for drawing an optical fiber from a preform. The diffuser traps and diffuses light radiation generated in the optical fiber preform by a fiber drawing oven.

7 Claims, 2 Drawing Sheets

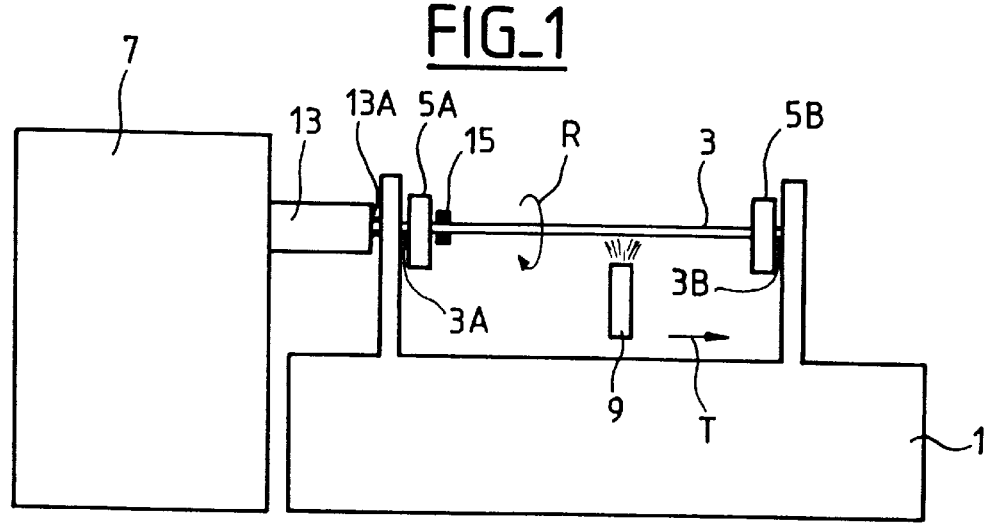
FIG_1
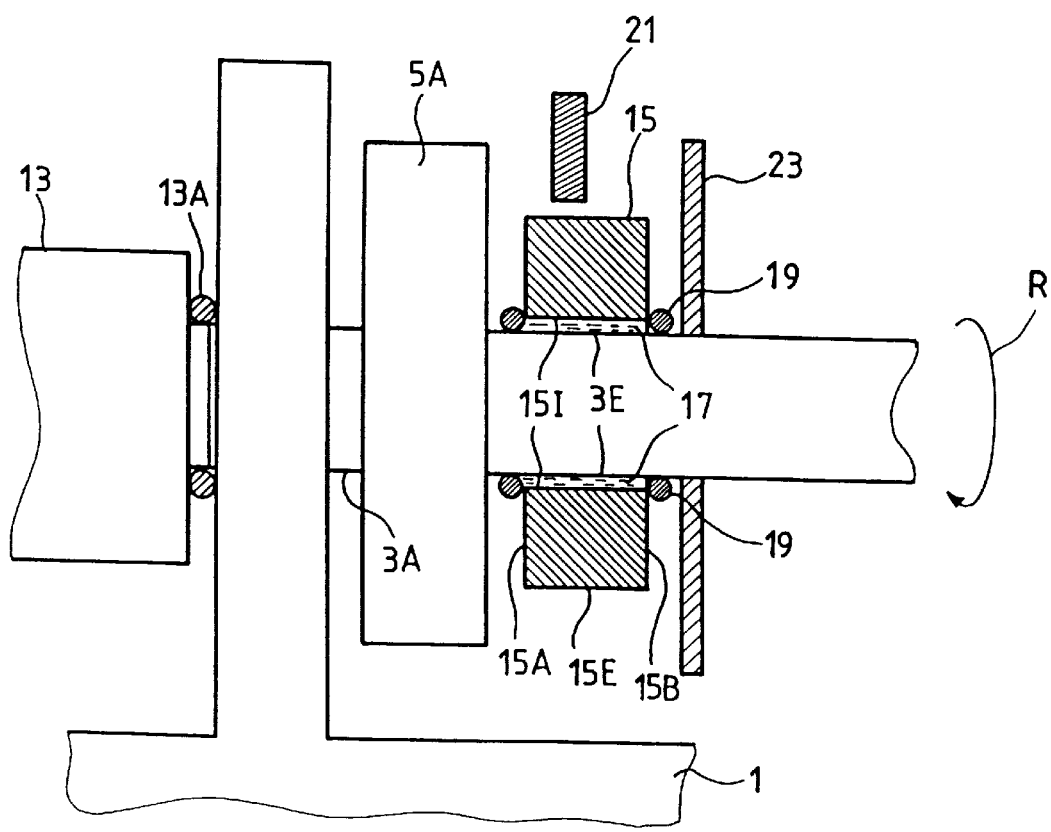
FIG_2

FIG_3
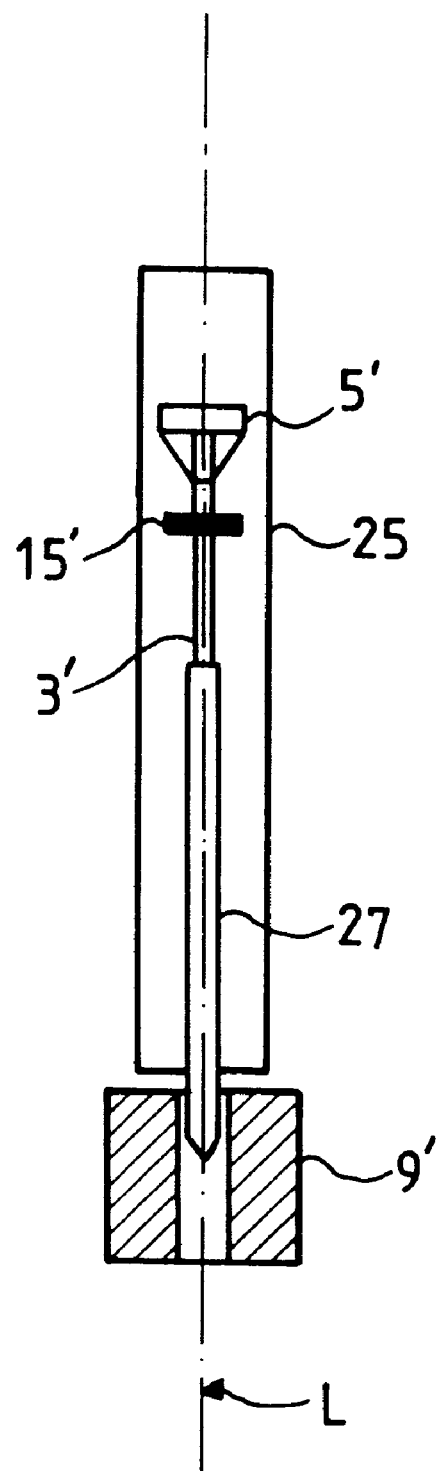

APPARATUS FOR MANUFACTURING AN OPTICAL FIBER PREFORM AND INCLUDING A RING FOR TRAPPING AND DIFFUSING LIGHT RADIATION

TECHNICAL FIELD OF THE INVENTION

The invention relates to apparatus for manufacturing an optical fiber preform, the apparatus comprising a glassmakers' lathe for holding a glass tube by means of chucks clamped to the two ends of the tube, gas feed means for injecting gaseous compounds into the inside of the tube via a leakproof connection at one end of the tube, and a source of the energy required for causing the gaseous compounds to be deposited inside the tube or for collapsing the tube after deposition has been completed.

BACKGROUND OF THE INVENTION

In such a device, heat energy from the source is transmitted to the leakproof connection via the corresponding end of the glass tube. This connection has a sealing gasket which is thus raised to a high temperature while the gaseous compounds are being deposited or while the tube is being collapsed. Unfortunately, it is very important for the gasket to maintain a good seal so as to prevent any risk of the gaseous compounds being exhausted into the medium surrounding the apparatus, and to avoid any contamination of the deposit by the surrounding medium.

A known solution to the problem of the leakproof connection between the gas feed means and the end of the tube being overheated consists in designing a gasket of a complex shape and in making it out of special materials so as to guarantee that the connection remains sealed at the temperatures generated by a blowtorch. Unfortunately, that solution increases the cost of manufacturing a preform.

Another known solution to the above problem consists in holding the glass tube on the lathe by means of a tubular endpiece. In this way, the end of the tube is located at a certain distance from the leakproof connection and the corresponding chuck which come into contact only with the tubular endpiece. The inside diameter of the endpiece is slightly greater than the outside diameter of the glass tube and it is assembled thereto by adhesive acting on an overlap zone where the glass tube is received in the tubular endpiece. This establishes a discontinuity which enables a large part of the heat energy to be dissipated by means of the end section of the glass tube. Nevertheless, that solution also increases cost due to making and assembling the endpiece.

After a preform has been subjected to an internal deposition method, similar problems arise when the preform is collapsed. At that time, the preform is held at its ends by the chucks. While the preform is being heated by the heater means for the purpose of collapsing it, the thermal radiation generated by the heater means heats the chucks that are holding the preform, thereby running a risk of the chucks becoming jammed.

Finally, similar problems arise when drawing an optical fiber from a preform. At that time, the preform is held vertically at one of its ends by means of a chuck. While the preform is being heated by the fiber-drawing oven, the thermal radiation it generates heats the chuck that is holding the preform and that also can run the risk of the chuck becoming jammed.

OBJECTS AND SUMMARY OF THE INVENTION

An object of the invention is to solve the problem of the leakproof connection between the gas feed unit and the end of the glass tube overheating in apparatus for manufacturing a preform, and to do in a manner that combines effectiveness and low cost.

Another object of the invention is to solve the problem of overheating the means for holding a preform while it is being collapsed or while a fiber is being drawn therefrom.

To this end, the invention provides apparatus for manufacturing an optical fiber preform from a tube of vitreous material, the apparatus comprising means for holding said tube during manufacture of said preform; and heater means supplying said tube with the heat energy required for manufacturing said preform; and diffuser means placed around at least one of the ends of said tube to trap and diffuse light radiation generated in said tube by said heater means.

The invention also provides an apparatus for drawing an optical fiber from a preform, the apparatus comprising means for holding one end of said preform; and means for lowering said preform as held by said end through a fiber drawing oven; and diffuser means disposed around said end of said preform to trap and diffuse light radiation generated in said end by said fiber drawing oven.

The heat energy supplied by the heater means propagates along the tube or the preform towards its ends mainly in the form of light radiation. The heat energy which is thus trapped and diffused by the diffuser means is therefore not transmitted to the leakproof connection or to the supporting chuck, thereby contributing to reducing the heating thereof.

Advantageously, the diffuser means has a refractive index close to that of the tube. By way of example, it can likewise be made of a vitreous material. This makes it possible to obtain good transmission of the radiation between the tube and the diffuser means.

Also advantageously, a liquid film can be inserted between the diffuser means and the tube. The light radiation passes from the tube to the diffuser means via the liquid film, and the diffuser means diffuses it to the surrounding medium. This increases the amount of light radiation that is transmitted from the tube to the diffuser means. The liquid film can have a refractive index that is close to that of the tube and of the diffuser means.

The invention makes it quick and easy to place the diffuser means on the glass tube, thereby making savings in equipment costs and in machine time costs. In addition, the risk of breaking the glass tube while the diffuser means is being mounted is considerably reduced compared with sticking on a tubular endpiece.

BRIEF DESCRIPTION OF THE DRAWINGS

Other characteristics and advantages of the invention will appear on reading the following description of an embodiment of the invention as shown by the drawings. In the figures:

FIG. 1 is a diagram showing apparatus of the invention for manufacturing a preform;

FIG. 2 is an enlarged view of FIG. 1 showing the diffuser means of the invention; and FIG. 3 is a diagram showing apparatus of the invention for drawing a fiber from a preform.

DETAILED DESCRIPTION OF THE EMBODIMENTS

A method of manufacturing a preform, e.g. the method known under the initials MCVD (for modified chemical vapor deposition) is implemented by means of apparatus comprising, FIG. 1, a glassmakers' lathe 1 which holds a silica-based tube 3 via two chucks 5A and 5B clamped onto the two ends 3A and 3B of the glass tube 3, and which cause it to rotate, R, about its axis. A gas feeder 7 serves to inject oxygen $O_2$ charged with the vapors of compounds such as silicon tetrachloride $SiCl_4$ and germanium tetrachloride $GeCl_4$, for example, to be injected into the inside of the silica tube 3. A blowtorch 9 heats the silica tube 3 and moves in translation T therealong in the same direction as the direction in which the gaseous compounds flow. In FIG. 1, this direction is from the end 3A clamped in the chuck 5A towards the end 3B clamped in the chuck 5B. On coming close to the end 3B, the blowtorch 9 returns quickly to its starting point to begin a new pass.

The blowtorch 9 supplies the heat energy required for depositing gaseous compounds inside the glass tube. In the heating zone closest to the blowtorch 9, the gaseous compounds react, forming particles which then deposit on the inside wall of the silica tube 3 downstream from the blowtorch 9 in the gas flow direction. The deposited particles are then vitrified by the blowtorch 9 as it moves along the silica tube 3.

At the end of deposition, the silica tube 3 has a cladding precursor formed by the first-deposited layers and a core precursor formed by the last-deposited layers. The gas feeder 7 is then turned off so as to stop injecting gas. The operation of collapsing the silica tube 3 then begins, during which the blowtorch 9 raises the temperature of the silica tube 3 so as to soften the silica and cause the tube to shrink. After a "starting" pass, the blowtorch 9 is moved very slowly so as to close up the silica tube in the form of a solid preform, which preform may optionally be recharged, i.e. additional silica-based layers may optionally be deposited thereon.

Communication between the gas feeder 7 and the silica tube 3 takes place at the end 3A of the tube via a leakproof connection 13 which includes an 0-ring gasket 13A. It is very important for the gasket to be leakproof so as to prevent any risk of the gaseous compounds being rejected into the medium surrounding the apparatus and conversely any risk of the MCVD deposition being contaminated by the surrounding medium.

In the invention, a diffuser in the form of a circularly cylindrical ring 15 are placed around the silica tube 3 close to the leakproof connection 13, downstream from the chuck 5A clamped to the end 3A of the silica tube 3. As mentioned above, the ring 15 can itself be made of silica so as to have a refractive index that is substantially equal to that of the tube 3 so that the change of index at the interface is negligible.

A liquid is inserted between the glass ring and the tube so as to form a film 17 (see FIG. 2). The heat energy supplied by the blowtorch 9 during deposition or during collapsing propagates along the silica tube 3 towards its ends 3A and 3B mainly in the form of light radiation. By means of the liquid film 17, this light radiation passes from the tube 3 to the ring 15 which diffuses it into the surrounding medium. The heat energy that is trapped and diffused in this way by the silica ring 15 is therefore not transmitted to the leakproof connection 13, thereby contributing to reducing heating thereof. The presence of the liquid film 17 increases the transmission of the light radiation between the two parts.

The liquid film 17 can likewise have a refractive index that is substantially equal to that of the glass ring 15 and of the glass tube 3. As can be seen in FIG. 2, the ring 15 is held in place relative to the tube 3 by means of two O-rings 19 which also hold the liquid film 17 between the ring 15 and the tube 3. By using lip gaskets, mounted in appropriate housings formed in the silica ring 15, it is possible to guarantee constant clearance relative to the silica tube 3. The liquid film 17 is distributed uniformly at the interface between the two pieces, thereby further contributing to good transmission of light radiation.

In a variant embodiment of the invention, the liquid film 17 is inserted in contact with a surface 15I of the ring 15 which is carefully polished so as to further increase the transmission of light radiation through the interface between the ring and the tube. Provision is also made to frost the side faces 15A and 15B and the outside face 15E of the silica ring 15 so as to increase the diffusion of light radiation in the form of heat into the medium surrounding the apparatus for manufacturing the preform.

Provision can also be made to cool the silica ring 15 by means of a compressed air blower 21 for maintaining the liquid film 17 at a temperature such that its refractive index remains substantially constant and equal to that of the ring 15 and of the tube 3. A deflector 23 prevents the cold air delivered by the blower 21 from disturbing heating of the silica tube 3 by the blowtorch 9.

The invention is also applicable to apparatus for drawing an optical fiber from a preform. Apparatus of this type comprises (see FIG. 3) lowering means 25 for lowering a preform 27 through a fiber drawing oven 9'. The lowering means 25 comprise a blind chuck 5' which is mounted to move in translation parallel to a fiber drawing axis L so as to displace the preform 27 by means of a glass bar 3' that is clamped at one end in the chuck 5' and welded at its other end to the preform 27.

According to the invention, a glass ring 15' is placed around the glass bar 3' and located close to the chuck 5' to trap and diffuse light radiation generated in the glass bar 3' by the fiber drawing oven 9'.

As mentioned above, the ring 15' placed around the bar 3' has a refractive index that is substantially equal to that of the bar 3' so that the change of index at the interface is negligible. A liquid is then inserted between the glass ring and the bar 3' so as to form a film 17. The heat energy supplied by the oven 9' propagates along the bar 3' mainly in the form of light radiation. By means of a liquid film 17, this light radiation is transmitted from the bar 3' to the ring 15' which diffuses it into the surrounding medium. The heat energy which is thus trapped and diffused by the silica ring 15' is therefore not transmitted to the blind chuck 5', thereby contributing to reducing its heating and to preventing any risk of it jamming. It is therefore no longer necessary to use a blind chuck that is made of refractory steel.

The above-described variants apply in like manner to apparatus of the invention for drawing a glass fiber from a preform.

The invention is not limited to the embodiments described above.

In particular, the space between the diffuser means and the preform need not be occupied by a liquid film but can be occupied by the ambient medium. Under such circumstances, it is preferable to ensure that the diffuser means fits on the preform with small tolerance.

In another alternative, the liquid film could be replaced by an index-matching gel.

What is claimed is:

1. An apparatus for drawing an optical fiber from a preform that is fixed to a glass bar, the apparatus comprising:

a fiber drawing oven for supplying heat to the preform;

a holder for holding an end portion of the glass bar;

a lowering mechanism for lowering the preform into said fiber drawing oven; and a diffuser for trapping and diffusing light radiation generated by the drawing oven in the end portion of the glass bar, said diffuser having an opening that allows a portion of the glass bar to pass through said diffuser and wherein said diffuser is fixed relative to the glass bar by gaskets.

2. The apparatus according to claim 1, wherein said diffuser has a refractive index close to that of the glass bar.

3. The apparatus according to claim 1, further comprising a liquid film disposed between said diffuser and the glass bar.

4. The apparatus according to claim 3, wherein said liquid film has a refractive index close to that of said diffuser and of the glass bar.

5. The apparatus according to claim 1, wherein said gaskets are lip gaskets.

6. The apparatus according to claim 1, further comprising an index-matching gel disposed between said diffuser and the glass bar.

7. An apparatus for processing an elongate workpiece of optical vitreous material, the apparatus comprising:

a holder that holds the workpiece;

a heater that supplies heat energy to the workpiece; and a diffuser disposed around at least one end of the workpiece, said diffuser trapping and diffusing light radiation generated in the workpiece by said heater, said diffuser having an opening that allows a portion of the workpiece to pass through said diffuser, said diffuser having frosted surfaces and wherein said diffuser is fixed relative to the workpiece by gaskets.

* * * * *